(No Model.)
J. M. HOLLAND.
NUT LOCK.
No. 256,688. Patented Apr. 18, 1882.
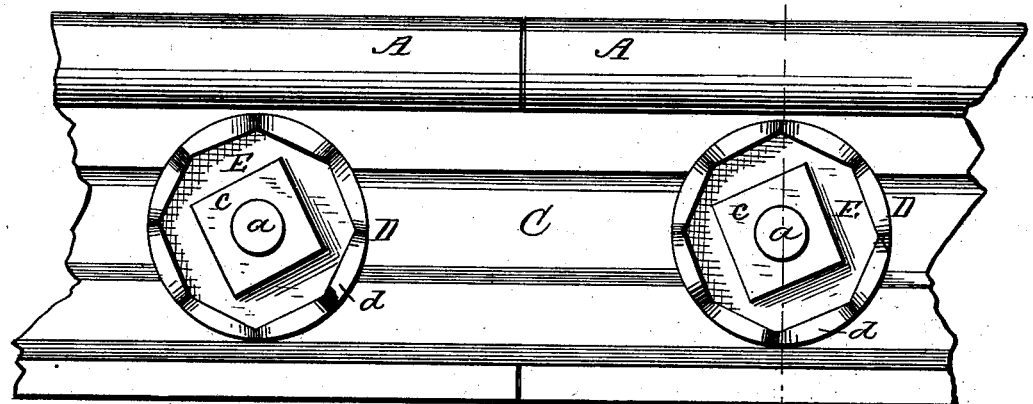
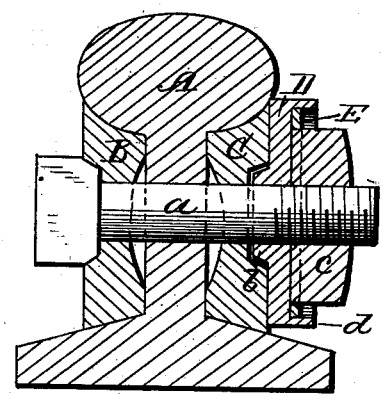
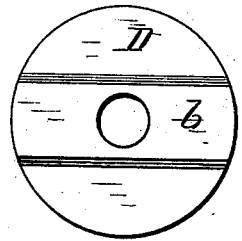 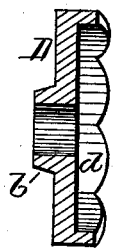 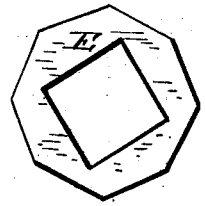
Witnesses.
F. L. Ourand
L. L. Miller
Inventor.
John M. Holland,
per Chas. H. Fowler.
Attorney

United States Patent Office.

JOHN M. HOLLAND, OF UTICA, ILLINOIS.

NUT-LOCK.

SPECIFICATION forming part of Letters Patent No. 256,688, dated April 18, 1882.

Application filed December 28, 1881. (No model.)

*To all whom it may concern:*

Be it known that I, JOHN M. HOLLAND, a citizen of the United States, residing at Utica, in the county of La Salle and State of Illinois, have invented certain new and useful Improvements in Nut-Locks; and I do hereby declare that the following is a full, clear, and exact description of the same, reference being had to the annexed drawings, making a part of this specification, and to the letters and figures of reference marked thereon.

Figure 1 of the drawings is a side elevation of my invention, showing it applied to a railroad-rail. Fig. 2 is a cross-section thereof, taken on line $x\ x$ of Fig. 1. Fig. 3 is a plan view of the inner side of the washer. Fig. 4 is a sectional elevation thereof, and Fig. 5 a plan view of the collar.

The present invention has relation to certain new and useful improvements in nut-locks adapted for use in securing together the ends of railroad-rails, and for various other purposes where nut-locks are found useful.

The object of the invention is to provide a simple and effective means for securely fastening the nut on the screw-threaded end of the bolt, as will be hereinafter described, and subsequently pointed out in the claim.

In the drawings I have shown one of the many uses to which my invention may be applied, A representing the two sections of a railroad-rail, and B C the ordinary grooved fish-plates for coupling said sections together, the usual screw-threaded bolts, $a$, passing through each section and through the fish-plates.

A washer, D, is placed over the screw-threaded end of each bolt $a$, and in this instance has upon its inner face a rib, $b$, which fits within the groove of the fish-plate C. When the washer is applied to other purposes than that of coupling railroad-rails, in place of the rib $b$ it has two spurs projecting from its inner face, which in both cases serve as a holding device to prevent the washer from turning. After the washer D has been passed over the end of the bolt $a$, the usual screw-threaded nut, $c$, is screwed down over the end of the bolt, and then a polygonal-shaped plate or collar, E, is placed over the nut, said collar having a square or other form of opening to correspond to the shape of the nut. The washer D has an annular flange, $d$, the inner side thereof being of polygonal form to correspond to that of the collar E, within which it seats itself.

The flange or rim $d$ is scalloped, as shown in Figs. 1 and 4, so that after the nut $c$ is tightly screwed down on the bolt and the collar E placed over it the scalloped edges of the flange or rim admit of its being more readily and effectually bent down over the collar upon its opposite sides, thereby securely and perfectly locking the nut on the bolt and preventing any possibility of its working loose.

Having now fully described my invention, what I claim as new, and desire to secure by Letters Patent, is—

In a nut-lock, the combination, with the screw-bolt $a$ and nut $c$, of the polygonal-formed collar E and the washer D, having upon its inner face or side a holding device and upon its opposite side or face a scalloped rim or flange, $d$, extending around the entire circumference of said washer, and having its interior side of polygonal form to correspond with the form of the collar, substantially as shown, and for the purpose set forth.

In testimony that I claim the above I have hereunto subscribed my name in the presence of two witnesses.

JOHN M. HOLLAND.

Witnesses:
WM. E. ARMSTRONG,
C. B. JOHNSON.